US012593079B2

(12) United States Patent
Zhang et al.

(10) Patent No.: US 12,593,079 B2
(45) Date of Patent: Mar. 31, 2026

(54) VIRTUAL LIVE-STREAMING CONTROL METHOD AND APPARATUS

(71) Applicant: Hangzhou AliCloud Feitian Information Technology Co., Ltd., Hangzhou City (CN)

(72) Inventors: Yuxin Zhang, Hangzhou (CN); Lin Rui, Hangzhou (CN)

(73) Assignee: Hangzhou AliCloud Feitian Information Technology Co., Ltd., Hangzhou City (CN)

( * ) Notice: Subject to any disclaimer, the term of this patent is extended or adjusted under 35 U.S.C. 154(b) by 13 days.

(21) Appl. No.: 18/685,220

(22) PCT Filed: Jan. 13, 2023

(86) PCT No.: PCT/CN2023/072109
§ 371 (c)(1),
(2) Date: Feb. 20, 2024

(87) PCT Pub. No.: WO2023/143133
PCT Pub. Date: Aug. 3, 2023

(65) Prior Publication Data
US 2025/0126304 A1 Apr. 17, 2025

(30) Foreign Application Priority Data
Jan. 25, 2022 (CN) .......................... 202210082937.2

(51) Int. Cl.
*H04N 21/2187* (2011.01)
*G06T 17/00* (2006.01)

(52) U.S. Cl.
CPC ......... *H04N 21/2187* (2013.01); *G06T 17/00* (2013.01)

(58) Field of Classification Search
CPC ............. H04N 21/2187; H04N 21/854; H04N 21/8146; H04N 21/233
See application file for complete search history.

(56) References Cited

U.S. PATENT DOCUMENTS

2007/0143493 A1* 6/2007 Mullig .................. H04L 65/752
709/232
2017/0294209 A1 10/2017 Newell et al.
(Continued)

FOREIGN PATENT DOCUMENTS

CN 110381266 A 10/2019
CN 110519611 A 11/2019
(Continued)

OTHER PUBLICATIONS

Yue-Hong et al., Exploring the Communication Characteristics of Virtual Reality, Journal of Hit (Social Sciences Edition), vol. 19, No. 2, Mar. 2017.
(Continued)

*Primary Examiner* — Jason Salce
(74) *Attorney, Agent, or Firm* — Maschoff Brennan

(57) ABSTRACT

An embodiment of the present application provides a virtual live-streaming control method, where the virtual live-streaming control method includes: setting up a virtual character to perform a live-streaming of news information related to a theme activity in a live-streaming room; driving the virtual character to broadcast at least one piece of the news information according to a preset broadcast rule; acquiring at least one activity event related to the news information; acquiring a static activity material generated based on the at least one activity event; and displaying the at least one activity event in the static activity material
(Continued)

through a target display area of the live-streaming room in response to a display instruction of the static activity material.

20 Claims, 5 Drawing Sheets

(56)                    References Cited

U.S. PATENT DOCUMENTS

| | | | |
|---|---|---|---|
| 2018/0361258 A1 | 12/2018 | Malyuk | |
| 2022/0377414 A1* | 11/2022 | Zu | H04N 21/4667 |
| 2023/0023085 A1* | 1/2023 | Zhu | G06T 13/40 |

FOREIGN PATENT DOCUMENTS

| | | |
|---|---|---|
| CN | 111988670 A | 11/2020 |
| CN | 112529992 A | 3/2021 |
| CN | 113194350 A | 7/2021 |
| CN | 113298585 A | 8/2021 |
| CN | 113421143 A | 9/2021 |
| CN | 113448475 A | 9/2021 |
| CN | 113691829 A | 11/2021 |
| CN | 113825029 A | 12/2021 |
| CN | 113825031 A | 12/2021 |
| CN | 114157897 A | 3/2022 |

OTHER PUBLICATIONS

Zhang Yuxin, Practical Exploration of Mobile Video Live Streaming in Integrated, Journal of News Research, vol. 11, No. 9, May 2020.

Notice of allowance mailed May 10, 2022 in Chinese App. No. 202210082937.2.

Office Action mailed Mar. 23, 2022 in Chinese App. No. 202210082937.2.

Second Office Action mailed Apr. 15, 2022 in Chinese App. No. 202210082937.2.

International Search Report and Written Opinion mailed Apr. 24, 2023 in related PCT Application No. PCT/CN2023/072109.

* cited by examiner

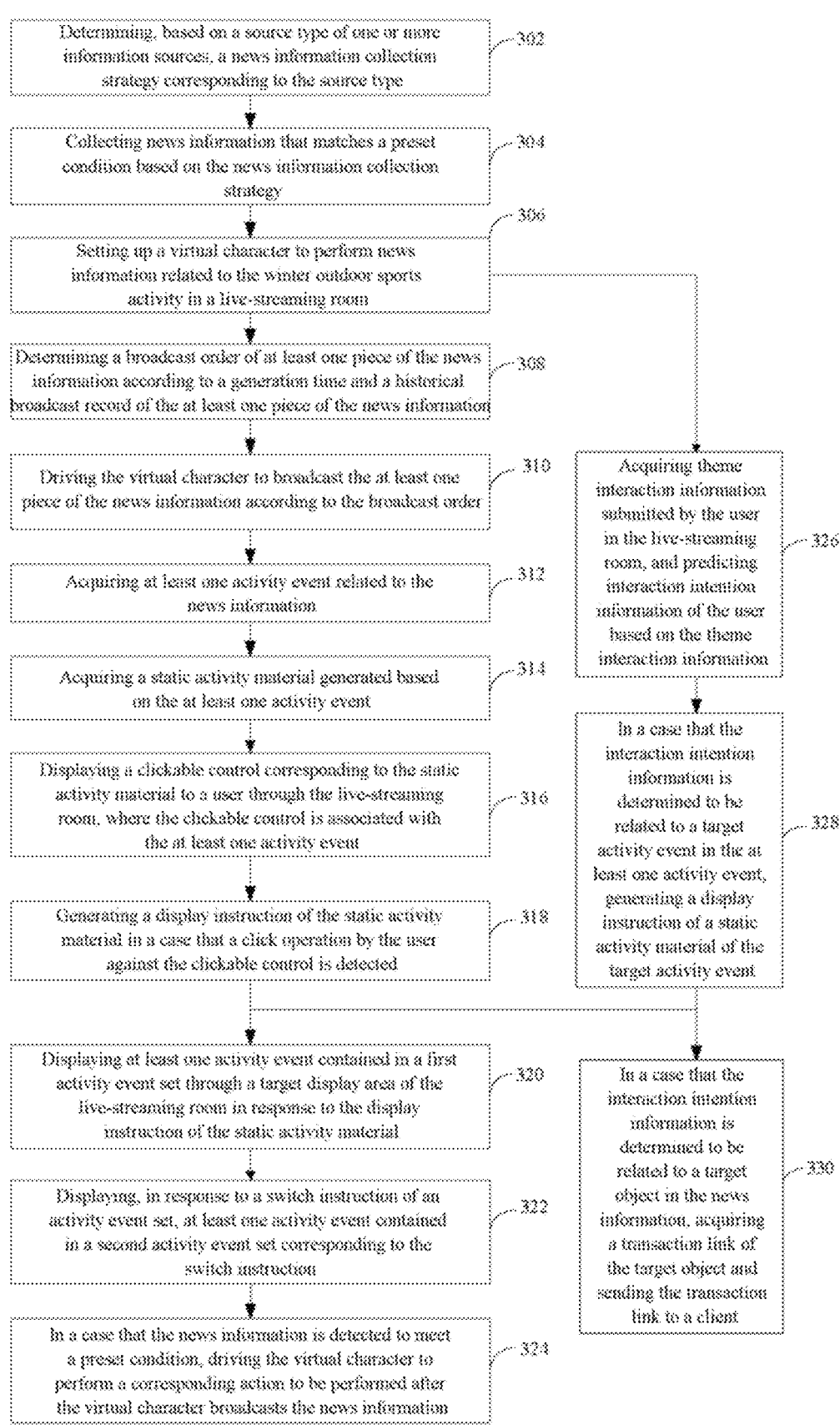

Determining, based on a source type of one or more information sources, a news information collection strategy corresponding to the source type —302

Collecting news information that matches a preset condition based on the news information collection strategy —304

Setting up a virtual character to perform news information related to the winter outdoor sports activity in a live-streaming room —306

Determining a broadcast order of at least one piece of the news information according to a generation time and a historical broadcast record of the at least one piece of the news information —308

Driving the virtual character to broadcast the at least one piece of the news information according to the broadcast order —310

Acquiring at least one activity event related to the news information —312

Acquiring a static activity material generated based on the at least one activity event —314

Displaying a clickable control corresponding to the static activity material to a user through the live-streaming room, where the clickable control is associated with the at least one activity event —316

Generating a display instruction of the static activity material in a case that a click operation by the user against the clickable control is detected —318

Displaying at least one activity event contained in a first activity event set through a target display area of the live-streaming room in response to the display instruction of the static activity material —320

Displaying, in response to a switch instruction of an activity event set, at least one activity event contained in a second activity event set corresponding to the switch instruction —322

In a case that the news information is detected to meet a preset condition, driving the virtual character to perform a corresponding action to be performed after the virtual character broadcasts the news information —324

Acquiring theme interaction information submitted by the user in the live-streaming room, and predicting interaction intention information of the user based on the theme interaction information —326

In a case that the interaction intention information is determined to be related to a target activity event in the at least one activity event, generating a display instruction of a static activity material of the target activity event —328

In a case that the interaction intention information is determined to be related to a target object in the news information, acquiring a transaction link of the target object and sending the transaction link to a client —330

FIG. 3

VIRTUAL LIVE-STREAMING CONTROL METHOD AND APPARATUS

CROSS-REFERENCE TO RELATED APPLICATIONS

This application is a National Stage of International Application No. PCT/CN2023/072109, filed on Jan. 13, 2023, which claims priority to Chinese Patent Application No. 202210082937.2, filed to China National Intellectual Property Administration on Jan. 25, 2022 and entitled "VIRTUAL LIVE-STREAMING CONTROL METHOD AND APPARATUS". The contents of the two applications are hereby incorporated by reference in their entireties.

TECHNICAL FIELD

Embodiments of the present application relate to the field of computer technology, and in particular, to a virtual live-streaming control method.

BACKGROUND

With the rise of live-streaming platforms, more and more users use live-streaming to promote various information in a live-streaming room of the live-streaming platform, such as e-commerce on the live-streaming platform, teaching on the live-streaming platform, and performing on the live-streaming platform.

In order to enhance the interest and interactivity of live-streaming, virtual image live-streaming, as a very important part of live-streaming services, has occupied an increasing proportion of live-streaming services in recent years.

However, at present, in the live-streaming platform, the live-streaming method through virtual image in live-streaming room is fixed and single, which can not better meet the needs of users. Therefore, an effective method is urgently needed to solve such problems.

SUMMARY

In view of this, embodiments of the present application provide a virtual live-streaming control method. One or more embodiments of the present application simultaneously relate to a virtual live-streaming control apparatus, a computing device, a computer-readable storage medium, and a computer program to address technical deficiencies existing in the prior art.

According to a first aspect of an embodiment of the present application, a virtual live-streaming control method is provided, including:

setting up a virtual character to perform a live-streaming of news information related to a theme activity in a live-streaming room;

driving the virtual character to broadcast at least one piece of the news information according to a preset broadcast rule;

acquiring at least one activity event related to the news information; acquiring a static activity material generated based on the at least one activity event; and displaying the at least one activity event in the static activity material through a target display area of the live-streaming room in response to a display instruction of the static activity material.

According to a second aspect of the embodiment of the present application, a virtual live-streaming control apparatus is provided, including:

a setup module, configured to set up a virtual character to perform a live-streaming of news information related to a theme activity in a live-streaming room;

a driving module, configured to drive the virtual character to broadcast at least one piece of the news information according to a preset broadcast rule;

a first acquisition module, configured to acquire at least one activity event related to the news information;

a second acquisition module, configured to acquire a static activity material generated based on the at least one activity event; and a display module, configured to display the at least one activity event in the static activity material through a target display area of the live-streaming room in response to a display instruction of the static activity material.

According to a third aspect of an embodiment of the present application, a computing device is provided, including:

a memory and a processor;

where the memory is used to store computer executable instructions, and the processor is configured to execute the computer executable instructions to implement the steps of any of the virtual live-streaming control method.

According to a fourth aspect of an embodiment of the present application, a computer-readable storage medium is provided, which stores a computer-executable instruction, when the instruction is executed by a processor, the steps of any of the virtual live-streaming control method are implemented.

According to a fifth aspect of an embodiments of the present application, a computer program is provided, when the computer program is executed in a computer, the computer is caused to execute the steps of the virtual live-streaming control method. An embodiment of the present application sets up a virtual character to perform a live-streaming of news information related to a theme activity in a live-streaming room; drives the virtual character to broadcast at least one piece of the news information according to a preset broadcast rule; acquires at least one activity event related to the news information; acquires a static activity material generated based on the at least one activity event; and displays the at least one activity event in the static activity material through a target display area of the live-streaming room in response to a display instruction of the static activity material.

In an implementation of the present application, in the process of setting up a virtual character to broadcast information related to a theme activity in the live-streaming room, in addition to orally broadcasting news information related to the theme activity through the virtual character in the live-streaming room, a static activity material generated based on an activity event can also be displayed through a target display area of the live-streaming room in a case that a user has the need to view the activity event related to the news information, which is conducive to enhancing the interest and interaction of live-streaming, and at the same time is conducive to realizing the diversity of live-streaming methods, so as to better meet the needs of users for different types of information.

BRIEF DESCRIPTION OF DRAWINGS

FIG. 3 is a process flow diagram of a virtual live-streaming control method provided by an embodiment of the present application.

DESCRIPTION OF EMBODIMENTS

Figure 1:
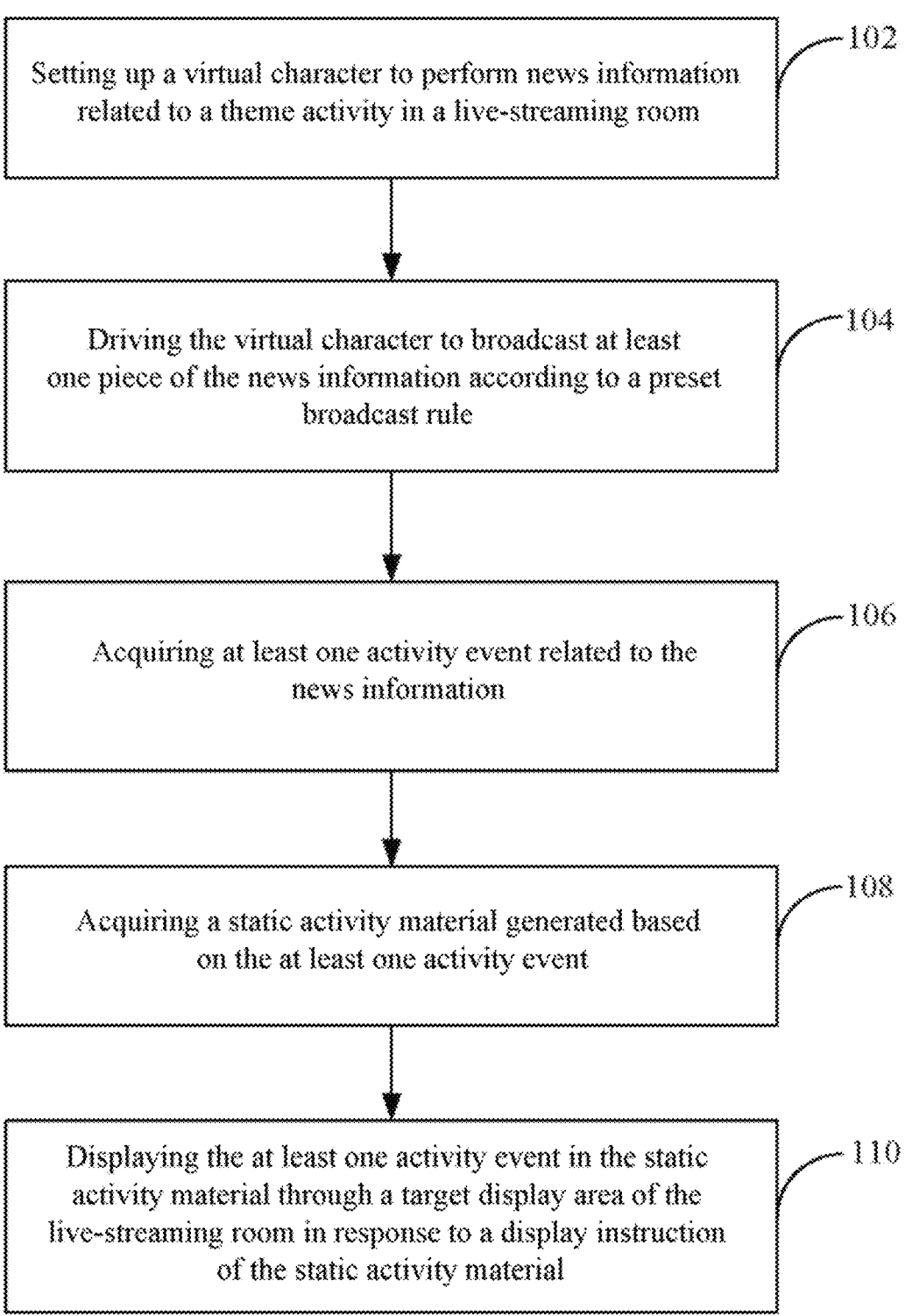
FIG. 1 is a flow diagram of a virtual live-streaming control method provided by an embodiment of the present application.

Many specific details are given in the following description to facilitate a full understanding of this specification. However, the present application may be implemented in many ways different from those described herein, and persons skilled in the art may do similar promotion without violating the intension of the present application, and therefore the present application is not subject to the specific implementation disclosed below.

Terms used in one or more embodiments of the present application are used solely for the purpose of describing specific embodiments and are not intended to limit one or more embodiments of the present application. The terms "a", "said" and "the" in the singular form as used in one or more embodiments of the present application and the accompanying claims are also intended to include the majority form, unless the context clearly indicates otherwise. It should also be understood that the term "and/or" as used in one or more embodiments of the present application refers to and encompasses any or all possible combinations of one or more related listed items.

It should be understood that although the terms first and second classes may be used to describe various information in one or more embodiments of the present application, such information should not be limited to these terms. These terms are used only to distinguish the same type of information from one another. For example, without departing from the scope of one or more embodiments of the present application, the first may also be referred to as the second, and likewise the second may be referred to as the first. Depending on the context, the word "if" as used here can be interpreted as "at time of . . . " or "when . . . " or "in response to determination of".

First, noun terms involved in one or more embodiments of the present application is explained.

Digital human: a virtual human with a digital form that has abilities to express itself with words, facial expressions, and body movements.

Live-streaming room: each live stream's presentation window corresponds to one live-streaming room. The live-streaming room is unique in a service platform.

Virtual live-streaming room: a digital human anchor and a digital live-streaming room constructed by digital drive technology provide live-streaming content in an interactive way of live-streaming by artificial man, which can also be understood as a live-streaming room with a specific type (a type of live-streaming by a virtual character as an anchor in a live-streaming room) in a live-streaming room. For example, it may include but not limited to game live-streaming room, film live-streaming room, life live-streaming room, comprehensive live-streaming room, etc. The virtual live-streaming room here can be any live-streaming room, and the virtual live-streaming room can include digital human anchors, scenes, live-streaming text and other components.

In the present application, a virtual live-streaming control method is provided. The present application also relates to a virtual live-streaming control apparatus, a computing device, a computer readable storage medium, and a computer program, which are described in detail in the following embodiments.

FIG. 1 shows a flow diagram of a virtual live-streaming control method provided according to an embodiment of the present application, including the following steps specifically.

Step 102, setting up a virtual character to perform a live-streaming of news information related to a theme activity in a live-streaming room.

Specifically, the live-streaming room is usually used for live-streaming of a commodity or a game, but in the case of a special theme activity, the virtual character in the live-streaming room can be set up to carry out the live-streaming around the theme activity. The theme activity can be a medium, medium-large or large scale event, competition or conference.

In practical application, the virtual character can be set up to carry out live-streaming for products related to the theme activity in the live-streaming room, but in the embodiment of the present application, the virtual character can be set up to alternate broadcast news information related to the theme activity in the live-streaming room for 24 h to meet the user's demand for acquiring news information related to the theme activity.

Step 104, driving the virtual character to broadcast at least one piece of the news information according to a preset broadcast rule.

Specifically, in the process of setting up the virtual character to perform live-streaming of the news information related to the theme activity in the live-streaming room, a corresponding broadcast rule can be set in advance to drive the virtual character to broadcast the news information according to the broadcast rule.

In the specific implementation, the driving the virtual character to broadcast the at least one piece of the news information according to the preset broadcast rule includes: determining a broadcast order of the at least one piece of the news information according to a generation time and a historical broadcast record of the at least one piece of the news information; and driving the virtual character to broadcast the at least one piece of the news information according to the broadcast order.

Specifically, due to the timeliness of the news information, in the broadcast process of the news information, for the acquired news information to be broadcast, the broadcast order of each piece of news information can be determined according to the generation time of different news information. Under normal circumstances, the later the generation time of news information, the more priority it can be broadcast, and the earlier the generation time of news information, the later it can be broadcast.

After determining the broadcast order of the at least one piece of the news information according to the generation time of the news information, the virtual character can be driven to broadcast each piece of news information according to the broadcast order. In practical application, in addition to determining the broadcast order of each piece of news information to be broadcast according to the generation time of the news information, the broadcast order of each piece of news information can be jointly determined by combining the generation time of the news information and its historical broadcast records. Under normal circumstances, if the generation times of two news information are the same, then if one piece of the news information has been broadcast at a certain historical time, then the other piece of the news information can be broadcast before the news information in the current broadcast round.

In addition, in addition to determining the broadcast order of different news information according to the generation time and historical broadcast record of the news information, it can also be determined in combination with the category of the news information to ensure the diversity of the category of news information broadcast in this round. For example, if two pieces of news information are acquired, and the category of the two pieces of the news information are respectively breaking news and periodic news, and in a case that no breaking news has been broadcast within a certain time period, the breaking news can be preferentially broadcast.

In addition, the theme activity may include at least two theme sub-activities, and accordingly, the driving the virtual character to broadcast the at least one piece of the news information according to the preset broadcast rule includes: driving the virtual character to broadcast at least one piece of first news information related to a first theme sub-activity; switching a next piece of broadcast information to at least one piece of second news information related to a second theme sub-activity in case that it is detected that a broadcast quantity of the at least one piece of first news information meets a first preset quantity threshold, or a broadcast duration of the at least one piece of first news information meets a first preset duration threshold; driving the virtual character to broadcast the at least one piece of second news information related to the second theme sub-activity; and driving the virtual character to broadcast the at least one piece of first news information related to the first theme sub-activity in case that it is detected that a broadcast quantity of the at least one piece of second news information meets a second preset quantity threshold, or a broadcast duration of the at least one piece of second news information meets a second preset duration threshold.

Specifically, since the theme activity may include at least two theme sub-activities, in the process of broadcasting the news information of the theme activity, the news information related to each theme sub-activity in the theme activity can be broadcast according to the preset broadcasting rule.

If the preset broadcast rule is that: in a case that a total broadcast duration of the at least one piece of first news information of the first theme sub-activity meets the first preset duration threshold, the at least one piece of second news information of the second theme sub-activity begins to be broadcast; in a case that a total broadcast duration of the at least one piece of second news information of the second theme sub-activity meets the second preset duration threshold, the at least one piece of first news information of the first theme sub-activity begins to be broadcast, then by determining whether a total duration of the news information of the current theme sub-activity meets a preset duration threshold, it can determine whether to continue to broadcast the news information of the current theme sub-activity, or change to broadcast the news information of other theme sub-activities.

In practical application, the first preset duration threshold and the second preset duration threshold can be equal or different. The specific values of the first preset duration threshold and the second preset duration threshold can be determined based on actual requirements, which is not limited here.

For example, the first preset duration threshold and the second preset duration threshold are both set as 10 min, and the at least one piece of first news information of the first theme sub-activity is currently broadcast, it can be determined whether the total broadcast duration of the at least one piece of first news information of the first theme sub-activity reaches 10 min during the broadcast process, if so, the at least one piece of second news information of the second theme sub-activity will begin to be broadcast. Similarly, during the broadcast process, it can be determined whether the total broadcast duration of the at least one piece of second news information reaches 10 min; if so, the at least one piece of first news information of the first theme sub-activity is then be broadcast, and so on.

The application of the virtual live-streaming control method provided by an embodiment of the present application to a virtual live-streaming scene of a sports event is taken as an example, if the theme activity is a skiing competition activity, the first theme sub-activity can be an activity event schedule, and the second theme sub-activity can be encyclopedia information related to an activity. Therefore, in order to avoid too single news information broadcast in the live-streaming room, the news information of a variety of different theme sub-activities can be broadcast alternately by setting a broadcast time of the news information of the different theme sub-activities, so as to meet users' demand for acquiring news information of different theme sub-activities. By driving the virtual character to broadcast news information of different theme sub-activities alternately, an embodiment of the present application is conducive to ensuring the diversity, comprehensiveness and completeness of the news information of the theme activity by the virtual character in the live-streaming room.

In a specific implementation, based on a source type of one or more information sources, a news information collection strategy corresponding to the source type is determined; news information that matches a preset condition is collected based on the news information collection strategy, where the preset condition includes the theme activity or a preset custom event.

Specifically, the news information collection strategy can be understood as the way in which news information in the information source is collected, such as the way of collecting the news information from other news websites, news platforms, and manually written sources.

In practical application, the virtual live-streaming control system determines a corresponding news information collection strategy of each source type by determining types of each information source. Then, after acquiring news information from different information sources, the corresponding news information collection strategy can be adopted to collect news information, so as to reduce the waste of news information collection resources.

Step 106, acquiring at least one activity event related to the news information. Specifically, when the virtual character is driven to broadcast the news information related to the theme activity, most case are driven to broadcast the news information orally by the virtual character. However, for some users, it may not be possible to quickly and accurately acquire news information concerned by them only by listening to it. In this case, an embodiment of the present application can generate a static activity material that can be displayed based on the activity event related to the news information, where the static activity material can contain text and/or picture information about the activity event.

Before generating the static activity material, at least one activity event related to news information can be acquired, and a corresponding static activity material can be generated based on the at least one activity event.

In a case that users have the need to view a related activity event, the static activity material can be displayed for them, so that users can acquire related news information by viewing text and/or picture information.

Following the above example, if the theme activity is a skiing competition activity, the first theme sub-activity can be the activity event schedule, and the second theme sub-activity can be the encyclopedia information related to the activity. An activity event involved in the activity event schedule may include but not limited to start time, end time, ongoing status, athletes participating in competitive events and other events of the competition events. An activity event involved in the encyclopedia information can include but not limited to origin, opening ceremony information, closing ceremony information, mascot and other events of the activity.

After acquiring this part of the activity event, the corresponding static activity material can be generated based on the activity event.

In step 108, acquiring a static activity material generated based on the at least one activity event.

In an embodiment the present application, the static activity material can be pre-generated based on an activity event related to the news information. In the process of driving the virtual character to broadcast the news information, the static activity material can be acquired first, and a clickable control can be generated based on the static activity material. When users have the need to view the static activity material, they can click on the clickable control to send a display command of the static activity material.

Accordingly, after the acquiring the static activity material generated based on the at least one activity event, the virtual live-streaming control method further includes: displaying a clickable control corresponding to the static activity material to a user through the live-streaming room, where the clickable control is associated with the at least one activity event; and generating the display instruction of the static activity material in a case that a click operation by the user against the clickable control is detected.

Specifically, after the clickable control corresponding to the static activity material is generated, the clickable control can be displayed to the user through the live-streaming interface in the live-streaming room, so as to guide the user to view the static activity material by clicking on the clickable control. Therefore, after detecting the click operation by the user against the clickable control, the display instruction of the static activity material can be generated, and a system responds to the display instruction to display the active event in the static activity material.

Step 110, displaying the at least one activity event in the static activity material through a target display area of the live-streaming room in response to a display instruction of the static activity material.

Specifically, at least one activity event in the static activity material can be displayed through the target display area of the live-streaming room in a case that it is detected that the user sends the display instruction of the static activity material by clicking on the clickable control.

In a specific implementation, the activity event forms at least two activity event sets, the displaying the at least one activity event in the static activity material through the target display area of the live-streaming room includes: displaying at least one activity event contained in a first activity event set through the target display area of the live-streaming room; and displaying, in response to a switch instruction of an activity event set, at least one activity event contained in a second activity event set corresponding to the switch instruction.

Figure 2:
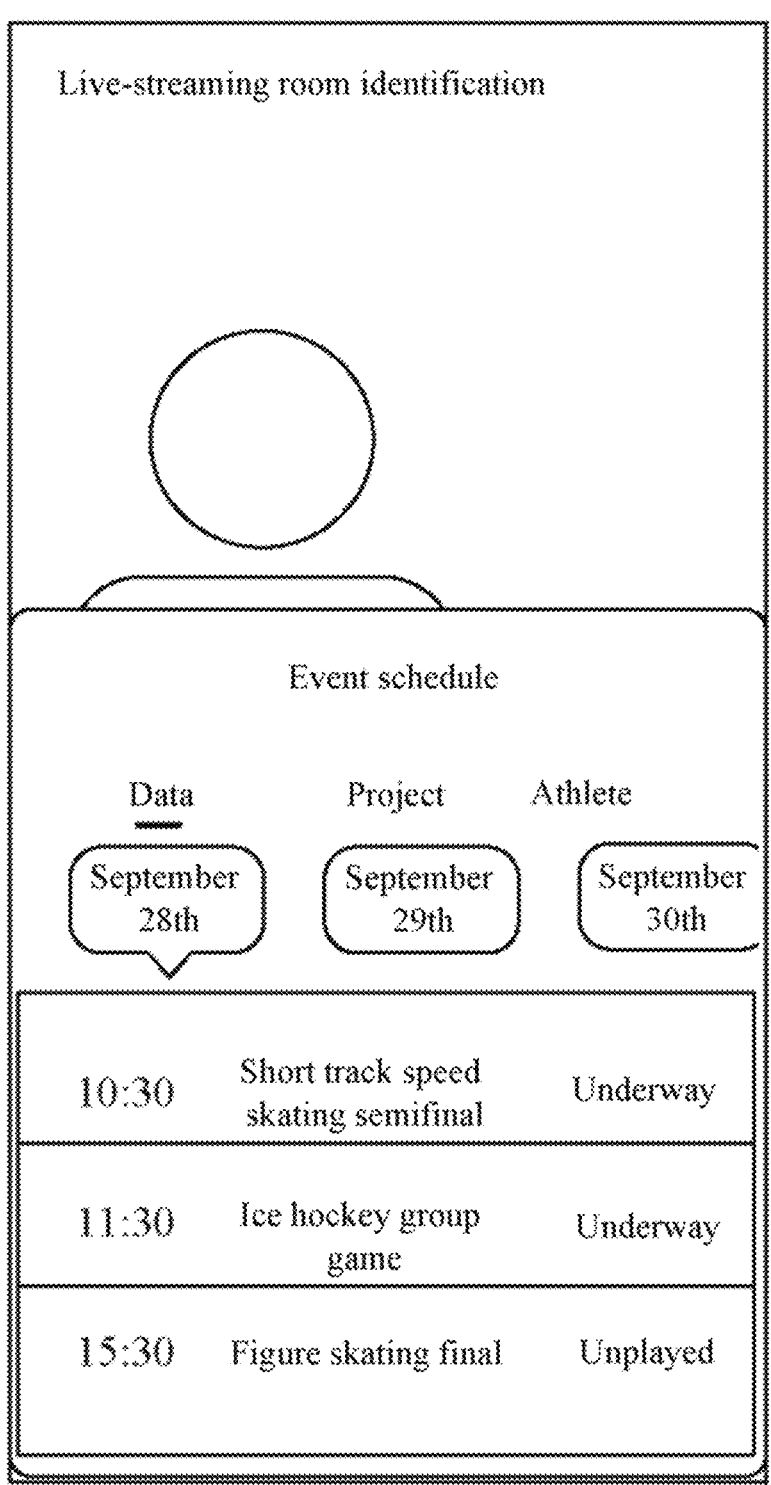
FIG. 2 is a schematic diagram of a display result of a static activity material provided by an embodiment of the present application.

Following the above example, if the theme activity is a skiing competitive activity, a display result diagram of a static activity material provided by an embodiment of the present application is shown in FIG. 2. FIG. 2 shows a static activity material of a activity sub-theme of an event schedule, the static activity material includes date, project and athlete of the event. The date, project and athlete can be separately used as an event set and so on. The set containing date, project and athlete can further contain detailed information such as the start time, project name and activity status of each competitive event. However, in different activity event sets, a display order of information such as the start time, project name and activity status of each competitive project may be different.

For example, when the user clicks on the date of the activity event set, sub-sets such as "September 28", "September 29" and "September 30" will be displayed to the user. If the user clicks on any sub-set, the information such as the start time, project name and activity status of the competitive project in the corresponding date of the sub-set will be displayed to the user in turn. Alternatively, when the user continues to click on the athlete of the activity event set, it switches from displaying the news information of the date of the activity event set to the user to displaying news information of the athlete of the activity event set to the user. In particular, sub-sets of "athlete U1", "athlete U2", "athlete U3" and so on can be displayed for the user. If the user clicks on any sub-set, information such as the start time, project name and activity status of the event in which the athlete corresponding to the sub-set participates will be displayed to the user in turn. The same is applicable for the above project sub-set.

In addition to sending the display instruction of the static activity material by the user clicking on the clickable control in the aforementioned embodiment, a related static activity material can also be actively displayed to the user through theme interaction information submitted by the user. It can be realized specifically in the following ways: after the acquiring the static activity material generated based on the at least one activity event, acquiring theme interaction information submitted by the user in the live-streaming room, and predicting interaction intention information of the user based on the theme interaction information; and in a case that the interaction intention information is determined to be related to a target activity event in the at least one activity event, generating a display instruction of a static activity material of the target activity event.

Specifically, when the virtual character broadcasts the news information of the theme activity in the live-streaming room, the user can submit a related theme interaction information for the news information, the theme interaction information can be comment information sent by the user, including but not limited to text, expression, image, etc.

After acquiring the theme interaction information of the user, the interaction intention information of the user can be determined according to the theme interaction information, that is, activity event information that the user wants to know or view can be determined. In a cast that it is determined that the user's interaction intention information is related to any one of the at least one of the aforementioned activity events (target activity event), the display instruction of the static activity material of the target activity event can be generated.

In the embodiment of the present application, the corresponding static activity material can be displayed for user according to the user's theme feedback information, so as to ensure the accuracy of the display results and improve the user's live-streaming viewing experience.

In addition, in an embodiment of the present application, in addition to broadcasting the news information related to the theme activity to the user, the live-streaming room can also display related feedback information of a target object with transaction attribute to the user. Specifically, theme interaction information submitted by the user in the live-streaming room can be acquired, and interaction intention information of the user is predicted based on the theme interaction information. In a case that the interaction intention information is determined to be related to a target object in the news information, feedback information corresponding to the target object is acquired and the feedback information is displayed through the target display area of the live-streaming room, where the target object has a transaction attribute.

Further, the feedback information includes a transaction link with the target object; accordingly, the acquiring the feedback information corresponding to the target object and displaying the feedback information through the target display area of the live-streaming room includes: acquiring the transaction link of the target object and sending the transaction link to a client, where the client displays the transaction link to the user and jumps from the live-streaming room to a transaction interface of an object transaction platform in a case that the user is detected to click on the transaction link. Specifically, as mentioned earlier, the target object has a transaction attribute, and the target object can be entity information such as commodities or tradable resources.

In addition to broadcasting the news information related to the theme activity to the user, the live-streaming room can also display the transaction link of the target object to the user in the case that the interaction intention information of the user is detected to be related to the target object contained in the news information, so as to improve conversion rate of the target object, that is, increase transaction volume of the target object.

Therefore, the theme interaction information submitted by the user in the live-streaming room can be acquired, and the interaction intention information of the user can be predicted based on the theme interaction information. In the case that the interaction intention information is determined to be related to the target object in the news information, the virtual character can display the transaction link of the target object to the user through the interface of the live-streaming room while orally broadcasting the news information, so as to guide the user to click on the transaction link. In the case that it is detected that the user clicks on the transaction link, the transaction interface of the object transaction platform is jumped to from the live-streaming room to guide the user to trade.

Following the above example, if the news information broadcast by the virtual character is a competition time of a skiing event, the target object can be a ski suit, a snowboard, etc. If the user asks for information such as price or material of the ski suit or the snowboard by submitting a comment, a link to the ski suit or the snowboard can be display to the user in the live-streaming room to guide the user to trade by clicking on the link.

The embodiment of the present application can display the transaction link of the target object in the news information to the user in the live-streaming room according to the theme feedback information of the user, so as to meet the needs of the user to acquire different types of information, and also conducive to improve freedom of broadcast content in the live-streaming room, so as to improve interactive experience of the user. In addition, in a case that the news information is detected to meet a preset condition, the virtual character can be driven to perform a corresponding action to be performed after the virtual character broadcasts the news information; where the preset condition includes one of the following: including a preset keyword and/or including a preset scene.

Further, in the case that the news information is detected to meet the preset condition, the user can be prompted with an action display control related to the theme activity, where the action display control is associated with at least one candidate action to be performed related to the theme activity; a click instruction of the user for the action display control can be received to display the at least one candidate action to be performed related to the theme activity; and a click instruction submitted by the user for the at least one candidate action to be performed can be received to determine the corresponding action to be performed.

Specifically, the preset condition include but is not limited to a preset keyword or a preset scene.

The corresponding action to be performed, that is, an action that can be performed by the virtual character, includes but not limited to dance movements, other actions related to the theme activity, etc.

In order to strengthen the interaction between the virtual character and the user, increase the interest of the live-streaming room, so as to enhance the user's interest in watching the live-streaming, an embodiment of the present application can drive the virtual character to perform certain action to be performed, including but not limited to dance movements, other actions related to the theme activity, etc.

Following the above example, the corresponding action to be performed include but is not limited to dance movements, skiing movements, curling movements, figure skating movements, etc. If the preset condition is to contain a preset keyword, that is, in a case that the news information is detected to contain a preset keyword such as "skiing", "curling" or "figure skating", etc., the virtual character can be driven to perform skiing movements, curling movements or figure skating movements after the virtual character broadcasts the news information. If the preset condition is to contain a preset scene, that is, when the news information is detected to contain a scene of "an athlete receiving awards", the virtual character can be driven to perform a corresponding celebration dance movements after the virtual character broadcasts the news information.

Alternatively, in a case that the news information is detected to meet the preset condition, the virtual character can prompt the user with the action display control related to the theme activity, and the action display control is associated with at least one candidate action to be performed related to the theme activity, so as to guide the user to submit a performance request of the candidate action to be performed by clicking on the action display control.

In practical application, In a case that the user is detected to click on the action display control, one or at least two candidate actions to be performed related to the theme activity are displayed to the user, and then in a case that the user is detected to click on any one or at least two candidate actions to be performed, the candidate action to be performed can be determined as the corresponding action to be performed of the virtual character, and the virtual character can be drive to perform the corresponding action to be performed.

Following the above example, a clickable icon can be displayed in the live-streaming interface, and text information similar to "I can also perform professional actions, come and choose" can be displayed near the icon to guide the user to click on the icon. In a case that the user clicks on the icon, a clickable control corresponding to the candidate action to be performed such as "skiing movements, figure skating movements, short track speed skating movements" related to the skiing competition activity can be displayed to the user. In a case that the user clicks on a clickable control corresponding to "cross-country skiing" is detected, the virtual character can be driven to perform the action of "cross-country skiing".

In a specific implementation, the corresponding action to be performed is dance movements, the driving the virtual character to perform the corresponding action to be performed further includes: determining a background audio corresponding to the dance movements; and playing the background audio and simultaneously driving the virtual character to perform the dance movements.

Specifically, when driving the virtual character to perform the dance movements, a corresponding audio of the dance movements can be determined first, and then the audio can be played as a background audio of the live-streaming room, and at the same time, the virtual character can be driven to perform the corresponding dance movements to increase the interest of the live-streaming room.

It should be noted that the virtual live-streaming control method provided by the embodiment of the present application can be applied to any of the live-streaming scenes or a combination live-streaming of at least two live-streaming scenes of the following: sports events virtual live-streaming scenes, e-commerce virtual live-streaming scenes, game virtual live-streaming scenes, education virtual live-streaming scenes, animation virtual live-streaming scenes, social virtual live-streaming scenes, event virtual live-streaming scenes, news information virtual live-streaming scenes, etc.

In order to facilitate understanding, the application of the virtual live-streaming control method provided by the embodiment of the present application to the virtual live-streaming scenes of sports events is taken as an example to describe the specific virtual live-streaming control method in detail.

An embodiment of the present application sets up a virtual character to perform a live-streaming of news information related to a theme activity in a live-streaming room; drives the virtual character to broadcast at least one piece of the news information according to a preset broadcast rule; acquires at least one activity event related to the news information; acquires a static activity material generated based on the at least one activity event; and displays the at least one activity event in the static activity material through a target display area of the live-streaming room in response to a display instruction of the static activity material.

In an implementation of the present application, in the process of setting up a virtual character to broadcast information related to a theme activity in the live-streaming room, in addition to orally broadcasting news information related to the theme activity through the virtual character in the live-streaming room, a static activity material generated based on an activity event can also be displayed through a target display area of the live-streaming room in a case that a user has the need to view the activity event related to the news information, which is conducive to enhancing the interest and interaction of live-streaming, and at the same time is conducive to realizing the diversity of live-streaming methods, so as to better meet the needs of users for different types of information.

The following, combined with the attached FIG. 3, takes an application of a virtual live-streaming control method in a winter outdoor competitive activity scene provided by the present application as an example to further explain the virtual live-streaming control method. FIG. 3 shows a process flow diagram of a virtual live-streaming control method provided by an embodiment of the present application, including the following steps.

Step 302, determining, based on a source type of one or more information sources, a news information collection strategy corresponding to the source type.

Step 304, collecting news information that matches a preset condition based on the news information collection strategy, where the preset condition includes a winter outdoor sports activity or a preset custom event.

Step 306, setting up a virtual character to perform a live-streaming of news information related to the winter outdoor sports activity in a live-streaming room.

After Step 306 is completed, Step 308 or Step 326 can continue to be performed.

Step 308, determining a broadcast order of at least one piece of the news information according to a generation time and a historical broadcast record of the at least one piece of the news information.

Step 310, driving the virtual character to broadcast the at least one piece of the news information according to the broadcast order.

Step 312, acquiring at least one activity event related to the news information.

Step 314, acquiring a static activity material generated based on the at least one activity event.

Step 316, displaying a clickable control corresponding to the static activity material to a user through the live-streaming room, where the clickable control is associated with the at least one activity event.

Step 318, generating a display instruction of the static activity material in a case that a click operation by the user against the clickable control is detected.

Step 320, displaying at least one activity event contained in a first activity event set through a target display area of the live-streaming room in response to the display instruction of the static activity material.

Step 322, displaying, in response to a switch instruction of an activity event set, at least one activity event contained in a second activity event set corresponding to the switch instruction.

Step 324, in a case that the news information is detected to meet a preset condition, driving the virtual character to perform a corresponding action to be performed after the virtual character broadcasts the news information.

Step 326, acquiring theme interaction information submitted by the user in the live-streaming room, and predicting interaction intention information of the user based on the theme interaction information.

Step 328, in a case that the interaction intention information is determined to be related to a target activity event in the at least one activity event, generating a display instruction of a static activity material of the target activity event.

After Step 328 is completed, Step 320 or Step 330 can continue to be performed.

Step 330, in a case that the interaction intention information is determined to be related to a target object in the news information, acquiring a transaction link of the target object and sending the transaction link to a client, where the client displays the transaction link to the user and jumps from the live-streaming room to a transaction interface of an object transaction platform in a case that the user is detected to click on the transaction link, where the target object has a transaction attribute.

In the implementation of the present application, in the process of setting up a virtual character to broadcast information related to a theme activity in the live-streaming room, in addition to orally broadcasting news information related to the theme activity through the virtual character in the live-streaming room, a static activity material generated based on an activity event or transaction link of the target object can also be displayed through a target display area of the live-streaming room in a case that a user has the need to view the activity event or the target object related to the news information, which is conducive to enhancing the interest and interaction of live-streaming, and at the same time is conducive to realizing the diversity of live-streaming methods, so as to better meet the needs of users for different types of information.

Figure 4:
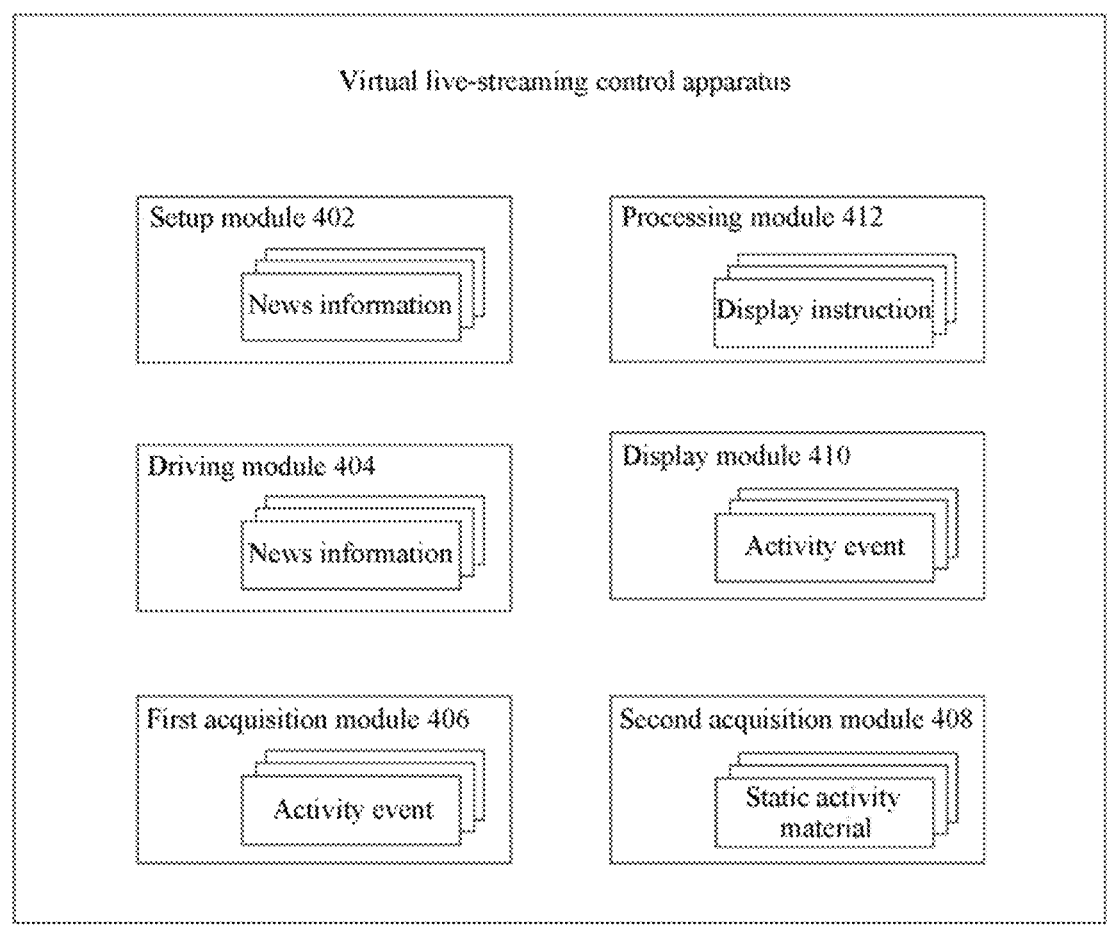
FIG. 4 is a structural diagram of a virtual live-streaming control apparatus provided by an embodiment of the present application.

Corresponding to the above embodiments of the method, the present application further provides an embodiment of a virtual live-streaming control apparatus. FIG. 4 shows a structural diagram of a virtual live-streaming control apparatus provided by an embodiment of the present application. As shown in FIG. 4, the apparatus includes: a setup module 402, a driving module 404, a first acquisition module 406, a second acquisition module 408 and a display module 410.

The setup module 402 is configured to set up a virtual character to perform a live-streaming of news information related to a theme activity in a live-streaming room; the driving module 404 is configured to drive the virtual character to broadcast at least one piece of the news information according to a preset broadcast rule; the first acquisition module 406 is configured to acquire at least one activity event related to the news information; the second acquisition module 408 is configured to acquire a static activity material generated based on the at least one activity event; and the display module 410 is configured to display the at least one activity event in the static activity material through a target display area of the live-streaming room in response to a display instruction of the static activity material.

In an implementation, the driving module 404 is further configured to: determine a broadcast order of the at least one piece of the news information according to a generation time and a historical broadcast record of the at least one piece of the news information; and drive the virtual character to broadcast the at least one piece of the news information according to the broadcast order.

In an implementation, the virtual live-streaming control apparatus further includes a processing module 412 configured to: determine, based on a source type of one or more information sources, a news information collection strategy corresponding to the source type; and collect news information that matches a preset condition based on the news information collection strategy, where the preset condition includes the theme activity or a preset custom event.

In an implementation, the processing module 412 is further configured to: display a clickable control corresponding to the static activity material to a user through the live-streaming room, where the clickable control is associated with the at least one activity event; and generate the display instruction of the static activity material in a case that a click operation by the user against the clickable control is detected.

In an implementation, the activity event forms at least two activity event sets, and the display module 410 is further configured to: display at least one activity event contained in a first activity event set through the target display area of the live-streaming room; and display, in response to a switch instruction of an activity event set, at least one activity event contained in a second activity event set corresponding to the switch instruction.

In an implementation, the processing module 412 is further configured to: acquire theme interaction information submitted by a user in the live-streaming room, and predict interaction intention information of the user based on the theme interaction information; and in a case that the interaction intention information is determined to be related to a target activity event in the at least one activity event, generate a display instruction of a static activity material of the target activity event.

In an implementation, the processing module 412 is further configured to: acquire theme interaction information submitted by a user in the live-streaming room, and predict interaction intention information of the user based on the theme interaction information; and in a case that the interaction intention information is determined to be related to a target object in the news information, acquire feedback information corresponding to the target object and displaying the feedback information through the target display area of the live-streaming room, where the target object has a transaction attribute.

In an implementation, the feedback information includes a transaction link with the target object. Accordingly, the processing module 412 is further configured to: acquire the transaction link of the target object and sending the transaction link to a client, where the client displays the transaction link to the user and jumps from the live-streaming room to a transaction interface of an object transaction platform in a case that the user is detected to click on the transaction link.

In an implementation, the processing module 412 is further configured to: in a case that the news information is detected to meet a preset condition, drive the virtual character to perform a corresponding action to be performed after the virtual character broadcasts the news information.

The preset condition includes one of the following: including a preset keyword and/or including a preset scene.

In an implementation, the processing module 412 is further configured to: in the case that the news information is detected to meet the preset condition, prompt a user with an action display control related to the theme activity, where the action display control is associated with at least one candidate action to be performed related to the theme activity; receive a click instruction of the user for the action display control to display the at least one candidate action to be performed related to the theme activity; receive a click instruction submitted by the user for the at least one candidate action to be performed to determine the corresponding action to be performed.

In an implementation, the corresponding action to be performed is dance movements, and the processing module 412 is further configured to: determine a background audio corresponding to the dance movements; and play the background audio and simultaneously drive the virtual character to perform the dance movements.

In an implementation, the theme activity includes at least two theme sub-activities; accordingly, the driving module 404 is further configured to: drive the virtual character to broadcast at least one piece of first news information related to a first theme sub-activity; switch a next piece of broadcast information to at least one piece of second news information related to a second theme sub-activity in case that it is detected that a broadcast quantity of the at least one piece of first news information meets a first preset quantity threshold, or a broadcast duration of the at least one piece of first news information meets a first preset duration threshold; drive the virtual character to broadcast the at least one piece of second news information related to the second theme sub-activity; and return to perform the step of driving the virtual character to broadcast the at least one piece of first news information related to the first theme sub-activity in case that it is detected that a broadcast quantity of the at least one piece of second news information meets a second preset quantity threshold, or a broadcast duration of the at least one piece of second news information meets a second preset duration threshold.

The above is an illustrative scheme of a virtual live-streaming control apparatus of the present embodiment. It should be noted that a technical scheme of the virtual live-streaming control apparatus belongs to the same idea as a technical scheme of the above-mentioned virtual live-streaming control method. For details not described in detail in the technical scheme of the virtual live-streaming control apparatus, reference may be made to the description of the technical scheme of the above-mentioned virtual live-streaming control method.

Figure 5:
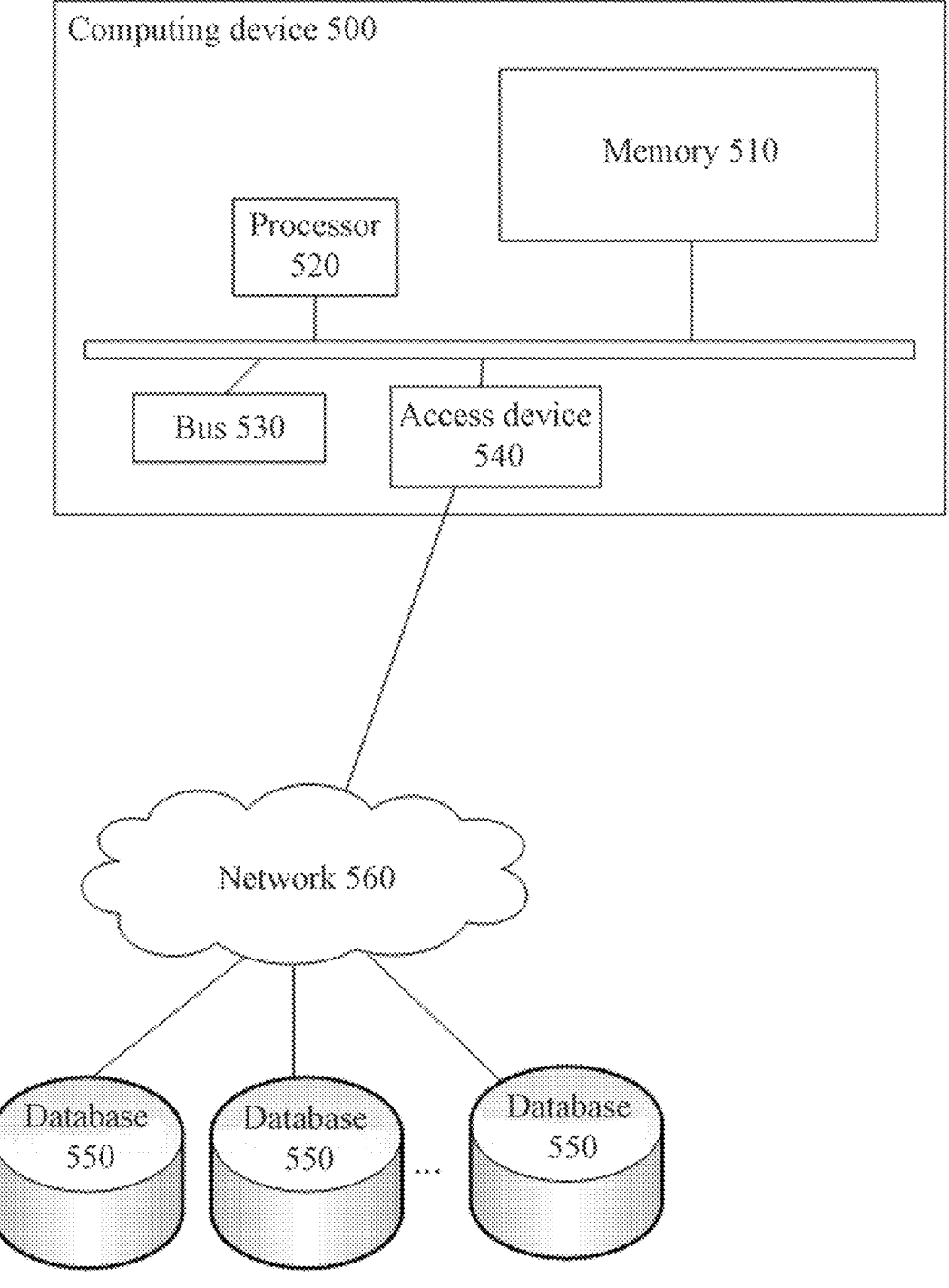
FIG. 5 is a structural block diagram of a computing device provided by an embodiment of the present application.

FIG. 5 shows a structural block diagram of a computing device 500 provided according to an embodiment of the present application. Components of the computing device 500 include but are not limited to a memory 510 and a processor 520. The processor 520 is connected to the memory 510 via bus 530, and a database 550 is configured to store data.

The computing device 500 also includes an access device 540 that enables the computing device 500 to communicate over one or more networks 560. Examples of these networks include a combination of communication networks of Public Switched Telephone Networks (PSTN), Local Area Networks (LAN), Wide Area Networks (WAN), Personal Area Networks (PAN), or such as the Internet. The access device 540 may include one or more of any type of network interface (e.g., Network Interface Card (NIC)) of wired or wireless, such as IEEE802.11 Wireless Local Area Network (WLAN) wireless interface, Worldwide Interoperability for Microwave Access (Wi-MAX) interface, Ethernet interface, Universal Serial Bus (USB) interface, cellular network interface, Bluetooth interface, Near Field Communication (NFC) interface, and so on.

In an embodiment of the present application, the above components of the computing device 500 and other components not shown in FIG. 5 may also be connected to each other, for example by a bus. It should be understood that the structural block diagram of the computing device shown in FIG. 5 is for example purposes only and is not a limitation of the scope of the present application. Persons skilled in the art may add or replace other parts as needed.

The computing device 500 can be any type of stationary or mobile computing device, including mobile computers or mobile computing devices (e.g., tablets, personal digital assistants, laptop computers, notebook computer, netbooks, etc.), mobile phones (e.g., smartphones), wearable computing devices (e.g., smart watches, smart glasses, etc.) or other types of mobile devices, or stationary computing devices such as desktop computers or PCs. The computing device 500 can also be a mobile or stationary server. The processor 520 is configured to execute the following computer-executable instruction, when the computer-executable instruction is executed by the processor, the steps of the above-mentioned virtual live-streaming control method are implemented. The above is an illustrative scheme of a computing device of the present embodiment. It should be noted that a technical scheme of the computing device belongs to the same idea as a technical scheme of the above-mentioned virtual live-streaming control method. For details not described in detail in the technical scheme of the computing device, please refer to the description of the technical scheme of the above-mentioned virtual live-streaming control method.

An embodiment of the present application further provides a computer-readable storage medium that stores computer-executable instructions, when the computer-executable instruction is executed by a processor, the steps of the above-mentioned virtual live-streaming control method are implemented.

The above is an illustrative scheme of a computer readable storage medium of the present embodiment. It should be noted that a technical scheme of the storage medium belongs to the same idea as a technical scheme of the above-mentioned virtual live-streaming control method. For details not described in detail in the technical scheme of the storage medium, reference may be made to the description of the technical scheme of the above-mentioned virtual live-streaming control method.

An embodiment of the present application also provides a computer program, where a computer is caused to perform the steps of the above-mentioned virtual live-streaming control method when the computer program is executed on the computer.

The above is an illustrative scheme of a computer program of the present embodiment. It should be noted that a technical scheme of the computer program belongs to the same idea as a technical scheme of the above-mentioned virtual live-streaming control method. For details not described in detail in the technical scheme of the computer program, please refer to the description of the technical scheme of the above-mentioned virtual live-streaming control method.

Specific embodiments of the present application are described above. Other embodiments are within the scope of the attached claims. In some cases, actions or steps described in the claim may be performed in a different sequence than in the embodiment and still achieve the desired result. In addition, the process described in the accompanying diagram does not necessarily require a specific sequence or sequential sequence to achieve the desired result. In some embodiments, multitasking and parallel processing are also possible or may be advantageous.

The computer instruction includes a computer program code, the computer program code can be source code form, object code form, executable file or some intermediate form. The computer readable medium may include: any entity or apparatus, recording medium, U drive, portable hard drive, magnetic disk, optical disc, computer memory, Read-Only Memory (ROM), Random Access Memory (RAM), electric carrier signal, telecommunication signal and software distribution medium, etc., which capable of carrying the computer program code. It should be noted that the contents of the computer readable medium may be appropriately increased or decreased according to the requirements of the legislation and patent practice in the jurisdiction, for example, in some jurisdictions, according to the legislation and patent practice, the computer readable medium does not include electric carrier signals and telecommunications signals.

It should be noted that, for the purpose of simple description, each of the above-mentioned embodiments of the method is expressed as a series of combinations of actions, but those skilled in the art should be aware that the embodiments of the present application are not limited by the sequence of actions described, because according to the embodiments of the present application, some steps may be performed in a different sequence or simultaneously. Secondly, persons skilled in the art should also be aware that the embodiments described in the present application are preferred embodiments, and that the actions and modules involved are not necessarily necessary for the embodiments of the present application.

In the above embodiments, the description of each embodiment has its own emphasis, and the part not detailed in one embodiment can be referred to the relevant description of other embodiments.

The above disclosed preferred embodiments of the present application are intended only to assist in the elaboration of the present application. The above-mentioned embodiments do not elaborate on all the details and do not limit the present disclosure to the specific embodiments described. Obviously, according to the contents of the embodiments of the present application, many modifications and changes can be made.

These embodiments are selected and specifically described in the present application for the purpose of better explaining the principle and practical application of the embodiments of the present application, so that technicians in the technical field can better understand and use the present application. The present application is limited only by the claims and their full scope and equivalents.

The invention claimed is:

1. A virtual live-streaming control method, comprising:
setting up a virtual character to perform a live-streaming of news information related to a theme activity in a live-streaming room;
driving the virtual character to broadcast at least one piece of the news information according to a preset broadcast rule;
acquiring at least one activity event related to the news information;
acquiring a static activity material generated based on the at least one activity event; and
displaying the at least one activity event in the static activity material through a target display area of the live-streaming room in response to a display instruction of the static activity material,
wherein the theme activity comprises at least two theme sub-activities, and
wherein the driving the virtual character to broadcast the at least one piece of the news information according to the preset broadcast rule comprises:
driving the virtual character to broadcast at least one piece of first news information related to a first theme sub-activity, and
switching a next piece of broadcast information to at least one piece of second news information related to a second theme sub-activity in case that it is detected that a broadcast quantity of the at least one piece of first news information meets a first preset quantity threshold, or a broadcast duration of the at least one piece of first news information meets a first preset duration threshold.

2. The virtual live-streaming control method according to claim 1, wherein the driving the virtual character to broadcast the at least one piece of the news information according to the preset broadcast rule comprises:
determining a broadcast order of the at least one piece of the news information according to a generation time and a historical broadcast record of the at least one piece of the news information; and
driving the virtual character to broadcast the at least one piece of the news information according to the broadcast order.

3. The virtual live-streaming control method according to claim 1, further comprising:
determining, based on a source type of one or more information sources, a news information collection strategy corresponding to the source type; and
collecting news information that matches a preset condition based on the news information collection strategy, wherein the preset condition comprises the theme activity or a preset custom event.

4. The virtual live-streaming control method according to claim 1, after the acquiring the static activity material generated based on the at least one activity event, further comprising:
displaying a clickable control corresponding to the static activity material to a user through the live-streaming room, wherein the clickable control is associated with the at least one activity event; and
generating the display instruction of the static activity material in a case that a click operation by the user against the clickable control is detected.

5. The virtual live-streaming control method according to claim 1, wherein the at least one activity event forms at least two activity event sets, the displaying the at least one activity event in the static activity material through the target display area of the live-streaming room comprises:
displaying at least one activity event contained in a first activity event set through the target display area of the live-streaming room; and
displaying, in response to a switch instruction of an activity event set, at least one activity event contained in a second activity event set corresponding to the switch instruction.

6. The virtual live-streaming control method according to claim 1, after the acquiring the static activity material generated based on the at least one activity event, further comprising:
acquiring theme interaction information submitted by a user in the live-streaming room, and predicting interaction intention information of the user based on the theme interaction information; and
in a case that the interaction intention information is determined to be related to a target activity event in the at least one activity event, generating a display instruction of a static activity material of the target activity event.

7. The virtual live-streaming control method according to claim 1, further comprising:
acquiring theme interaction information submitted by a user in the live-streaming room, and predicting interaction intention information of the user based on the theme interaction information; and
in a case that the interaction intention information is determined to be related to a target object in the news information, acquiring feedback information corresponding to the target object and displaying the feedback information through the target display area of the live-streaming room, wherein the target object has a transaction attribute.

8. The virtual live-streaming control method according to claim 7, wherein the feedback information comprises a transaction link with the target object;

accordingly, the acquiring the feedback information corresponding to the target object and displaying the feedback information through the target display area of the live-streaming room comprises:

acquiring the transaction link of the target object and sending the transaction link to a client, wherein the client displays the transaction link to the user and jumps from the live-streaming room to a transaction interface of an object transaction platform in a case that the user is detected to click on the transaction link.

9. The virtual live-streaming control method according to claim 1, further comprising:

in a case that the news information is detected to meet a preset condition, driving the virtual character to perform a corresponding action to be performed after the virtual character broadcasts the news information;

wherein the preset condition comprises one of the following: comprising a preset keyword and/or comprising a preset scene.

10. The virtual live-streaming control method according to claim 9, further comprising:

in the case that the news information is detected to meet the preset condition, prompting a user with an action display control related to the theme activity, wherein the action display control is associated with at least one candidate action to be performed related to the theme activity;

receiving a click instruction of the user for the action display control to display the at least one candidate action to be performed related to the theme activity; and receiving a click instruction submitted by the user for the at least one candidate action to be performed to determine the corresponding action to be performed.

11. The virtual live-streaming control method according to claim 9, wherein the corresponding action to be performed is dance movements, the driving the virtual character to perform the corresponding action to be performed further comprises:

determining a background audio corresponding to the dance movements; and playing the background audio and simultaneously driving the virtual character to perform the dance movements.

12. The virtual live-streaming control method according to claim 1, wherein the driving the virtual character to broadcast the at least one piece of the news information according to the preset broadcast rule further comprises:

after switching the next piece of broadcast information to the at least one piece of second news information related to the second theme sub-activity, driving the virtual character to broadcast the at least one piece of second news information related to the second theme sub-activity; and returning to perform the step of driving the virtual character to broadcast the at least one piece of first news information related to the first theme sub-activity in case that it is detected that a broadcast quantity of the at least one piece of second news information meets a second preset quantity threshold, or a broadcast duration of the at least one piece of second news information meets a second preset duration threshold.

13. A non-transitory computer-readable storage medium, wherein the computer-readable memory medium stores computer executable instructions, a processor, when executing the computer executable instructions, is configured to:

set up a virtual character to perform a live-streaming of news information related to a theme activity in a live-streaming room;

drive the virtual character to broadcast at least one piece of the news information according to a preset broadcast rule;

acquire at least one activity event related to the news information;

acquire a static activity material generated based on the at least one activity event; and display the at least one activity event in the static activity material through a target display area of the live-streaming room in response to a display instruction of the static activity material, wherein the theme activity comprises at least two theme sub-activities, and wherein, the processor is configured to:

drive the virtual character to broadcast at least one piece of first news information related to a first theme sub-activity, and switch a next piece of broadcast information to at least one piece of second news information related to a second theme sub-activity in case that it is detected that a broadcast quantity of the at least one piece of first news information meets a first preset quantity threshold, or a broadcast duration of the at least one piece of first news information meets a first preset duration threshold.

14. A computing device, comprising:

a memory and a processor;

wherein the memory is configured to store computer executable instructions, and the processor is configured to execute the computer executable instructions, the processor, when executing the computer executable instructions, is configured to:

set up a virtual character to perform a live-streaming of news information related to a theme activity in a live-streaming room;

drive the virtual character to broadcast at least one piece of the news information according to a preset broadcast rule;

acquire at least one activity event related to the news information;

acquire a static activity material generated based on the at least one activity event; and display the at least one activity event in the static activity material through a target display area of the live-streaming room in response to a display instruction of the static activity material, wherein the theme activity comprises at least two theme sub-activities, and wherein, the processor is configured to:

drive the virtual character to broadcast at least one piece of first news information related to a first theme sub-activity, and switch a next piece of broadcast information to at least one piece of second news information related to a second theme sub-activity in case that it is detected that a broadcast quantity of the at least one piece of first news information meets a first preset quantity threshold, or a broadcast duration of the at least one piece of first news information meets a first preset duration threshold.

15. The computing device according to claim 14, wherein the processor is configured to:

determine a broadcast order of the at least one piece of the news information according to a generation time and a historical broadcast record of the at least one piece of the news information; and drive the virtual character to broadcast the at least one piece of the news information according to the broadcast order.

16. The computing device according to claim 14, wherein the processor is configured to:

determine, based on a source type of one or more information sources, a news information collection strategy corresponding to the source type; and collect news information that matches a preset condition based on the news information collection strategy, wherein the preset condition comprises the theme activity or a preset custom event.

17. The computing device according to claim 14, wherein the processor, after acquiring the static activity material generated based on the at least one activity event, is configured to:

display a clickable control corresponding to the static activity material to a user through the live-streaming room, wherein the clickable control is associated with the at least one activity event; and generate the display instruction of the static activity material in a case that a click operation by the user against the clickable control is detected.

18. The computing device according to claim 14, wherein the at least one activity event forms at least two activity event sets, the processor is configured to:

display at least one activity event contained in a first activity event set through the target display area of the live-streaming room; and display, in response to a switch instruction of an activity event set, at least one activity event contained in a second activity event set corresponding to the switch instruction.

19. The computing device according to claim 14, wherein the processor is configured to:

acquire theme interaction information submitted by a user in the live-streaming room, and predict interaction intention information of the user based on the theme interaction information; and in a case that the interaction intention information is determined to be related to a target activity event in the at least one activity event, generate a display instruction of a static activity material of the target activity event.

20. The computing device according to claim 14, wherein the processor is configured to:

acquire theme interaction information submitted by a user in the live-streaming room, and predict interaction intention information of the user based on the theme interaction information; and in a case that the interaction intention information is determined to be related to a target object in the news information, acquire feedback information corresponding to the target object and displaying the feedback information through the target display area of the live-streaming room, wherein the target object has a transaction attribute.

\* \* \* \* \*